(12) United States Patent
Lukac et al.

(10) Patent No.: US 11,677,792 B2
(45) Date of Patent: Jun. 13, 2023

(54) IP TOLERANCE AND SIGNALING INTERWORKING

(71) Applicant: Avaya Inc., Santa Clara, CA (US)

(72) Inventors: Tibor Lukac, Superior, CO (US); Harsh V. Mendiratta, East Brunswick, NJ (US)

(73) Assignee: Avaya Inc., Santa Clara, CA (US)

( * ) Notice: Subject to any disclaimer, the term of this patent is extended or adjusted under 35 U.S.C. 154(b) by 42 days.

(21) Appl. No.: 17/161,142

(22) Filed: Jan. 28, 2021

(65) Prior Publication Data

US 2021/0152612 A1    May 20, 2021

Related U.S. Application Data

(62) Division of application No. 15/617,605, filed on Jun. 8, 2017, now Pat. No. 10,931,720.

(51) Int. Cl.
*H04L 65/1104* (2022.01)
*H04L 65/1073* (2022.01)
(Continued)

(52) U.S. Cl.
CPC ...... *H04L 65/1104* (2022.05); *H04L 61/4535* (2022.05); *H04L 61/5007* (2022.05);
(Continued)

(58) Field of Classification Search
CPC ... H04L 65/1104; H04L 61/5007; H04L 67/14
See application file for complete search history.

(56) References Cited

U.S. PATENT DOCUMENTS

| 7,474,675 | B2 | 1/2009 | Park et al. |
| 7,720,976 | B2 | 5/2010 | Chu et al. |

(Continued)

FOREIGN PATENT DOCUMENTS

| CN | 101094182 | 12/2007 |
| CN | 103354992 | 10/2013 |

(Continued)

OTHER PUBLICATIONS

Rosenberg et al. "SIP: Session Initiation Protocol," Network Working Group, Jun. 2002, RFC 3261, 270 pages.
(Continued)

*Primary Examiner* — Esther B. Henderson
(74) *Attorney, Agent, or Firm* — Sheridan Ross P.C.

(57) ABSTRACT

In an attempt to establish a communication session between a first communication entity and a second communication entity, a first message is received. For example, the first message may be a SIP INVITE message. A determination is made, based on a registration message from the first communication entity and/or the second communication entity, that at least one of the first communication entity or the second communication entity is Internet Protocol (IP) version intolerant. In response to determining that the at least one of the first communication entity or the second communication entity is IP version intolerant, one or more IP addresses are adapted in messages (e.g., the SIP INVITE message) for establishing the communication session. The adaption changes/removes the one or more IP addresses to a different IP version to ensure proper IP compatibility.

18 Claims, 7 Drawing Sheets

(51) Int. Cl.
    *H04L 61/4535* (2022.01)
    *H04L 61/5007* (2022.01)
    *H04L 65/1045* (2022.01)
    *H04L 67/14* (2022.01)
    *H04L 61/251* (2022.01)
    *H04L 101/30* (2022.01)
    *H04L 101/385* (2022.01)
    *H04L 101/659* (2022.01)
    *H04L 101/686* (2022.01)

(52) U.S. Cl.
    CPC ...... *H04L 65/1045* (2022.05); *H04L 65/1073* (2013.01); *H04L 67/14* (2013.01); *H04L 61/251* (2013.01); *H04L 2101/30* (2022.05); *H04L 2101/385* (2022.05); *H04L 2101/659* (2022.05); *H04L 2101/686* (2022.05)

(56) References Cited

U.S. PATENT DOCUMENTS

| | | | |
|---|---|---|---|
| 7,779,131 B2* | 8/2010 | Nishida | H04L 65/1101 709/227 |
| 8,811,393 B2 | 8/2014 | Reddy et al. | |
| 8,854,991 B1 | 10/2014 | Breau et al. | |
| 10,164,934 B1 | 12/2018 | Bittfield et al. | |
| 10,931,720 B2 | 2/2021 | Lukac et al. | |
| 2005/0066038 A1 | 3/2005 | Sakamoto et al. | |
| 2006/0165062 A1* | 7/2006 | Nishida | H04L 67/14 370/352 |
| 2007/0022479 A1 | 1/2007 | Sikdar et al. | |
| 2008/0002698 A1 | 1/2008 | Pantalone et al. | |
| 2009/0298521 A1 | 12/2009 | Finlayson | |
| 2010/0135239 A1 | 6/2010 | Hurtta et al. | |
| 2012/0082158 A1* | 4/2012 | Reddy | H04L 69/08 370/389 |
| 2013/0007291 A1 | 1/2013 | Nickols | |
| 2016/0036943 A1 | 2/2016 | Kish et al. | |

FOREIGN PATENT DOCUMENTS

| | | |
|---|---|---|
| CN | 103428168 | 12/2013 |
| EP | 1511271 | 3/2005 |

OTHER PUBLICATIONS

Official Action with English Translation for China Patent Application No. 201810588117.4, dated Sep. 10, 2020 27 pages.
Official Action for India Patent Application No. 201824021355, dated Jul. 10, 2020 6 pages.
Official Action for U.S. Appl. No. 15/617,605, dated Apr. 11, 2019 7 pages Restriction Requirement.
Official Action for U.S. Appl. No. 15/617,605, dated Aug. 30, 2019 13 pages.
Official Action for U.S. Appl. No. 15/617,605, dated Apr. 29, 2020 13 pages.
Notice of Allowance for U.S. Appl. No. 15/617,605, dated Oct. 6, 2020 5 pages.
Official Action with English Translation for China Patent Application No. 201810588117.4, dated Apr. 9, 2021 6 pages.
Notice of Allowance with machine translation for China Patent Application No. 201810588117.4, dated Jun. 29, 2021 4 pages.

* cited by examiner

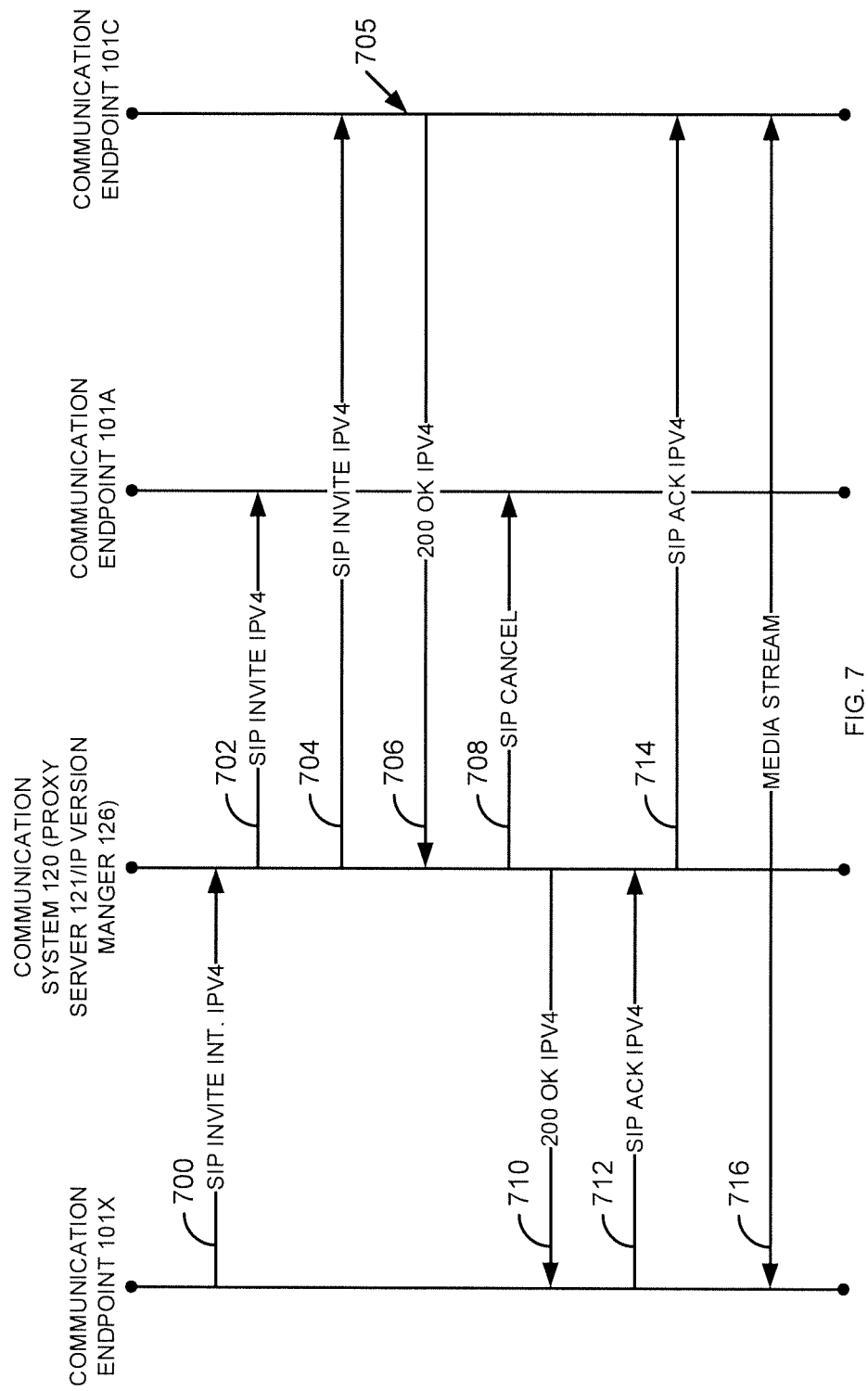

IP TOLERANCE AND SIGNALING INTERWORKING

CROSS REFERENCE TO RELATED APPLICATION

The present application is a divisional of U.S. patent application Ser. No. 15/617,605, filed Jun. 8, 2017, entitled "IP TOLERANCE AND SIGNALING AND INTERWORKING", which is incorporated herein by this reference in its entirety.

BACKGROUND

Internet Protocol (IP) version 4 (IPV4) is a network layer protocol that provides communication capabilities over the Internet. In IPV4, each IP address is 32 bits long, which allows for 4.3 billion unique addresses to identify devices. With so many mobile communication devices now in service, additional IP addresses are needed before the addresses of IPV4 become exhausted. Internet Protocol Version 6 (IPv6), which is the replacement for IPv4, increases the number of IP addresses available by changing the way the addresses are assigned. In IPv6, an IP address is 128 bits long.

Existing Requests for Comments (RFCs) for the Session Initiation Protocol (SIP) state that the newer IPV6 solutions need to account for the addresses of IPV4—and older IPV4 implementations must also support both IPV4 and IPV6. While a number of newer implementations support both types of IP addresses when the administered address is either IPv4 or IPv6, this approach is not universal. In other words, there are cases where a newer implementation will not support IPv4 addresses in the messages when configured as IPv6 device; and, will not support IPv6 addresses, when configured as an IPv4 device.

Moreover, the majority of the older implementations, which are large in number and support IPv4 only, do not tolerate IPv6 addresses in SIP messaging. If the IPv6 addresses are included in the SIP messages, such implementations may work incorrectly or in worst case may crash rather than handling IPV6 addressing. What is needed is a way to identify IP version intolerance to provided better interworking in a mixed IPV4/IPV6 environment.

SUMMARY

These and other needs are addressed by the various embodiments and configurations of the present disclosure. In an attempt to establish a communication session between a first communication entity and a second communication entity, a first message is received. For example, the first message may be a SIP INVITE message. A determination is made, based on a registration message from the first communication entity and/or the second communication entity, that at least one of the first communication entity or the second communication entity is Internet Protocol (IP) version intolerant. In response to determining that at least one of the first communication entity or the second communication entity is IP version intolerant, one or more IP addresses are adapted in messages (e.g., the SIP INVITE message) for establishing the communication session. The adaption changes/removes the one or more IP addresses to a different IP version to ensure proper IP compatibility.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "communication entity" as used herein may be any entity that is an endpoint in a dialog. A communication entity may be a communication endpoint, a Back-to-Back User Agent, a communication system, a SIP User Agent (SIP UA), and/or the like. A dialog is a communication session between communication entities that has its own connection identifier (e.g., as discussed in FIGS. 4-5). For example, in SIP, a dialog has a unique session identifier for each SIP dialog.

The SIP messages types disclosed herein, such as a SIP INVITE message, a SIP 200 OK message, a SIP ACK message, a SIP NOTIFY message, a SIP REGISTER message, a SIP PUBLISH message, a SIP 488 NOT ACCEPTABLE HERE message, a SIP SUBSCRIBE message, a SIP NOTIFY message, a SIP PUBLISH message, and/or the like are based on standard defined SIP messages per the SIP standards. The disclosure describes that some of these messages may be modified in order to provide IP tolerance between different communication entities. When citing standard SIP messaging herein, one of ordinary skill in the art would recognize that the scope of these messages is limited to the SIP protocol unless noted otherwise.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 7 is a flow diagram of a process for call forking where multiple communication endpoints of a user has been registered using a single address of record.

DETAILED DESCRIPTION

Figure 1:
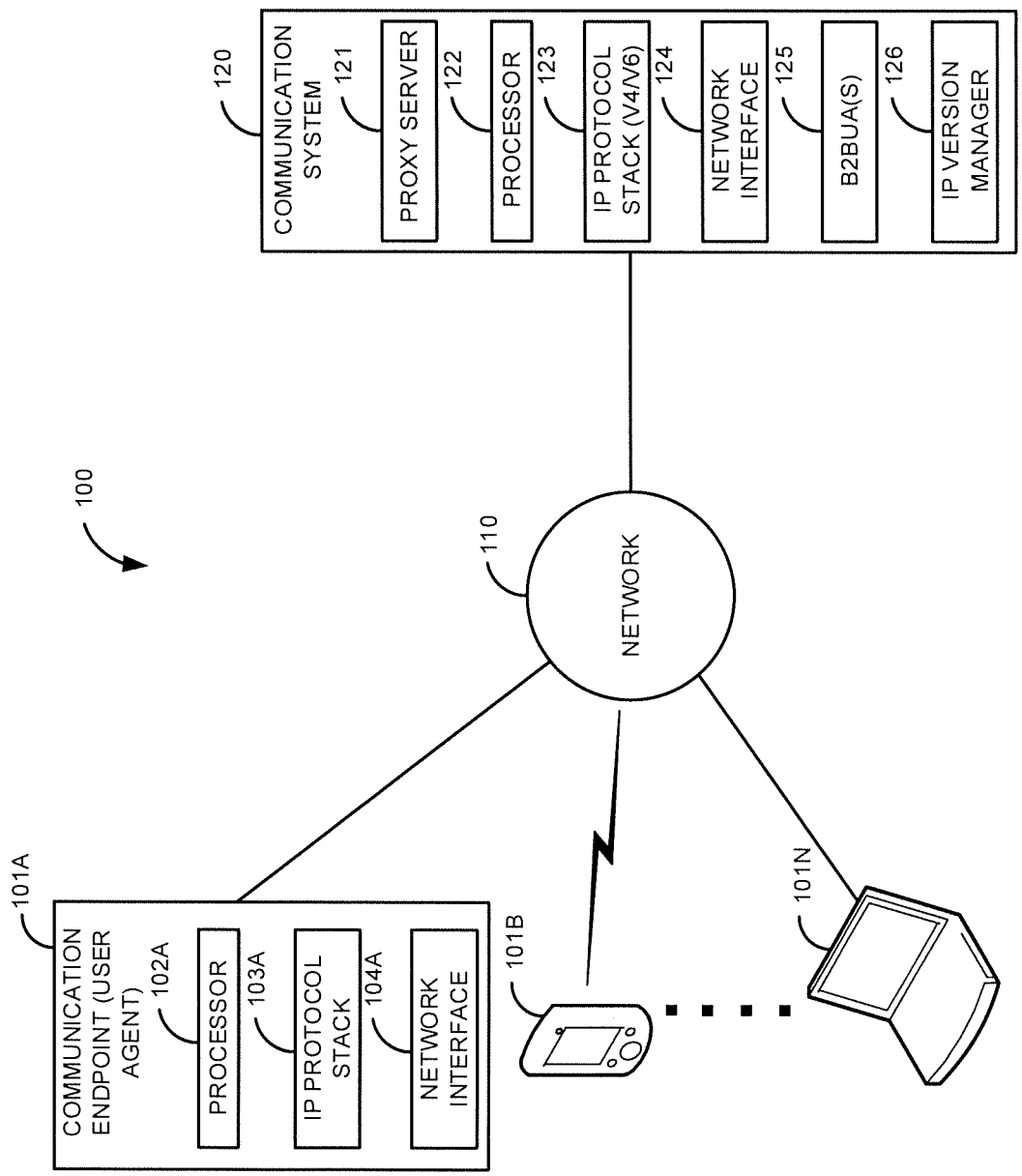
FIG. 1 is an illustrative block diagram of a first illustrative system for dealing with IP version intolerance.

FIG. 1 is an illustrative block diagram of a first illustrative system 100 for dealing with IP version intolerance. The first illustrative system 100 comprises communication endpoints 101A-101N, a network 110, and a communication system 120.

The communication endpoints 101A-101N can be or may include any communication endpoint device that can communicate on the network 110, such as, a Personal Computer (PC), a telephone, a video system, a cellular telephone, a Personal Digital Assistant (PDA), a tablet device, a notebook device, a web server, a media server, a smart phone, and/or the like. The communication endpoints 101A-101N are devices where a communication sessions ends. The communication endpoints 101A-101N are not network elements that facilitate and/or relay a communication session in the network, such as a communication manager or router. As shown in FIG. 1, any number of communication endpoints 101A-101N may be connected to the network 110. The communication endpoints 101A-101N may be Session Initiation Protocol (SIP) User Agents (SIP UAs).

The communication endpoint 101A further comprises a processor 102A, an IP protocol stack 103A, and a network interface 104A. Although not shown, the communication endpoints 101B-101N may also comprise the elements 102-104 in a similar configuration to the communication endpoint 101A.

The processor 102A can be or may include any hardware processor, such as, a microprocessor, a microcontroller, a Digital Signaling Processor (DSP), an application specific processor, a multi-core processor, and/or the like. The processor 102A can process software/firmware instructions to implement the communication endpoint 101 processes described herein.

The IP protocol stack 103A can be or may include any firmware/software that can be used to support the Internet Protocol (IP). The IP protocol stack 103A may support IPV4, IPV6, or a combination of both. The IP protocol stack 103A may further support other IP versions along with other protocol stacks. For example, the communication endpoint 101A may support SIP, H.323, Web Real-Time Communication (WebRTC) protocol, Session Description Protocol (SDP), Real-Time Communication Protocol (RTCP), and/or the like.

The network interface 104A can be or may include any hardware interface that allows the communication endpoint 101 to communicate on the network 110, such as an Ethernet interface, a WiFi interface, a cellular interface, a fiber optic interface, a wireless interface, and/or the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, video protocols, WebRTC, Integrated Services Digital Network (ISDN), and the like. Thus, the network 110 is an electronic communication network configured to carry messages via packets and/or circuit switched communications.

The communication system 120 can be or may include any hardware system coupled with software/firmware that can manage communications on the network 110, such as, a communication manager, a session manager, a Private Branch Exchange (PBX), a router, a switch, a proxy server 121, a central office switch, and/or the like. The communication system 120 further comprises the proxy server 121, a processor 122, an IP protocol stack 123, a network interface 124, one or more Back-to-Back User Agents (B2BUA) 125, and an IP version manager 126.

The proxy server 121 can be or may include any proxy server that can manage communication sessions between communication endpoints 101A-101N. In one embodiment, the proxy server 121 may be a SIP proxy server. The SIP proxy server 121 may manage a communication session (i.e., a single SIP dialog) between two or more communication endpoints 101.

The processor 122 can be or may include any hardware processor. For example, the processor 122 may be the same or similar to the processor 102.

The IP protocol stack 123 can be the same or different from the IP protocol stack 103 in the communication endpoint 101. The IP protocol stack 123 supports both IPV4 and IPV6 while the IP protocol stack 103 may only support one or both of IPV4 or IPV6.

The network interface 124 may be the same or different from the network interface 104. The network interface 124 may comprise multiple network interfaces 124. For example, the network interface 124 may comprise a WiFi and an Ethernet interface.

The Back-to-Back User Agent (B2BUA) 125 can be or may include any application that is inserted into a communication session between two or more communication endpoints 101A-101N. For example, the B2BUA 125 may be a call recording application, a call forwarding application, a call forking application, a transcription application, a translation application, and/or the like. A B2BUA 125 may be IP intolerant. For example, a B2BUA 125 may only support IPV4 or IPV6 in SIP messaging. Although the B2BUA 125 is shown in the communication system 120, in other embodiments, the B2BUA 125 may be separate from the communication system 120, such as in a SIP proxy server or other SIP entity.

The IP version manager 126 can be or may include any firmware/software that can manage different versions of the Internet Protocol. For example, the IP version manager 126 can swap between IPV4 and IPV6 (or between IPV6 and IPV4) addressing to protect IP intolerant communication endpoints 101 and B2BUAs 125 that are IP intolerant.

Figure 2:
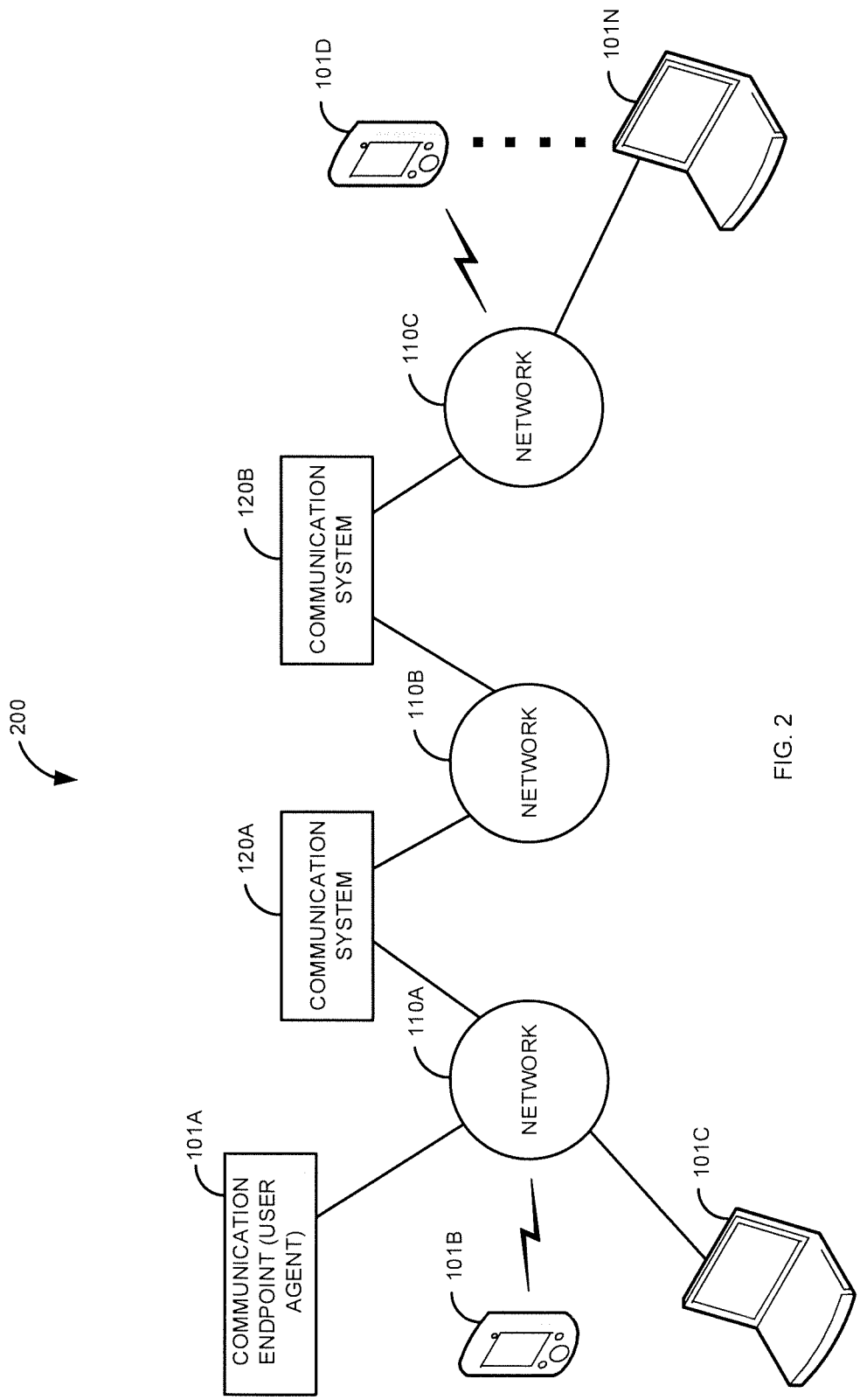
FIG. 2 is an illustrative block diagram of a second illustrative system for dealing with IP version intolerance between communication systems.

FIG. 2 is an illustrative block diagram of a second illustrative system 200 for dealing with IP version intolerance between communication systems 120. The second illustrative system 200 comprises the communication endpoints 101A-101N, networks 110A-110C, and the communication systems 102A-120B. FIG. 2 is an illustrative example of where the communication systems 120 may be distributed. For example, the network 110B may be the Internet and the networks 110A and 110C may be corporate networks. In FIG. 2, in addition to the communication endpoints 101A-101N, one or more of the communication systems 120A-120B may be IP intolerant. For example, communication system 120A (e.g., proxy server 121) may use IPV4/IPV6 and communication system 120B may only use IPV4. In FIG. 2, other devices (not shown) may also be present. For example, firewalls may exist between communication systems 120A/120B and network 110B.

Figure 3:
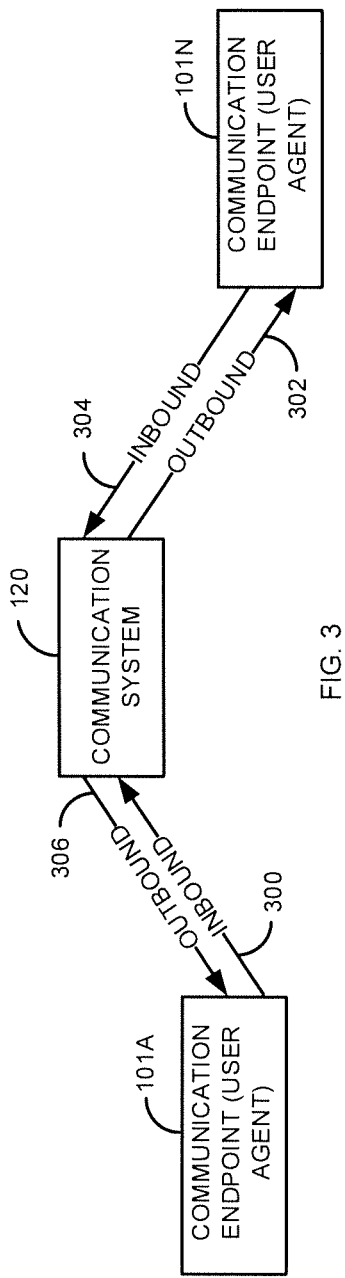
FIG. 3 is an illustrative block diagram of messaging flow in a communication session between communication endpoints with IP tolerance/intolerance.

FIG. 3 is an illustrative block diagram of messaging flow in a communication session between communication endpoints 101A-101N (communication entities) with IP tolerance/intolerance. The process of FIG. 3 is discussed using communication endpoints 101A-101N. As discussed herein, and in the claims, a communication endpoint 101 can be a communication entity. However, in some embodiments, the process of FIG. 3 may be between two non-communication endpoints (e.g., as shown in FIG. 2 where a communication session may involve two communication systems 120, or where one communication entity is a B2BUA 125). Alternatively, only one of the communication entities may be a communication endpoint 101, such as a communication session between a communication endpoint 101 and a media server/B2BUA 125.

IP tolerance/intolerance, as defined herein, is where a communication entity (e.g., a communication endpoint 101, a B2BUA 125, an application, a communication system 120, a proxy server 121, and/or other device (e.g., a gateway, session border controller, etc.)) is unable to receive and/or respond to messages of a different IP version at the application layer. Examples of application layer protocols are SIP, H.323, WebRTC, H.624, G711, and/or the like. Dealing with different IP versions at the application layer is different from dealing with different IP versions at the network layer (e.g., as defined in the ISO 7 layer model). IP is a network layer protocol. Adaptation between different versions of IP (specifically IPV4/IPV6) at the network layer is well known and not within the scope of this patent application.

If a device or application is IP intolerant, the communication system 120 changes one or more of the outbound messages 302/306 to ensure that communication sessions can be properly established. Below is a listing of different types of IP tolerance/intolerance.

IPV4 Intolerant these communication entities can accept and generate IPV4 addresses only in the signaling over IPV4 connections. IPV4 intolerant devices/applications cannot send/receive messages containing IPV6 addresses.

IPV6 Intolerant these communication entities can accept and generate IPV6 addresses only in the signaling over IPV6 connections. IPV6 intolerant devices/applications cannot send/receive messages containing IPV4 addresses.

IPV4 Tolerant: in addition to the IPV4 addresses, these communication entities can accept and generate IPV6 addresses in the signaling over IPV4 connections.

IPV6 Tolerant: in addition to the IPV6 addresses, these communication entities can accept and generate IPV4 addresses in the signaling over IPV6 connections.

IPV46 Intolerant: these communication entities support both IPV4 and IPV6 addresses: these communication entities can accept and generate only IPV4 addresses in the signaling over IPV4 connections; and, only IPV6 addresses, over IPV6 connections. (this classification is applicable to SIP communication entities only)

IPV46 Tolerant: these communication entities support both IPv4 and IPV6 addresses: they can accept and generate IPv4 addresses in the signaling over IPV6 connections; and, IPV6 addresses, over IPV4 connections. (this classification is applicable to the SIP communication entities only).

Below, in Table 1, is a listing of the different combinations of IP tolerance/intolerance and whether the communication system 120 needs to change one or more of the outbound messages 302/306 to ensure IP version compatibility.

TABLE 1

| Communication Endpoint 101A | Communication Endpoint 101N | Communication system 120 |
|---|---|---|
| IPV4 Intolerant | IPV4 Intolerant | No Adaptation |
| IPV4 Intolerant | IPV6 Intolerant | Adapt Outbound 302/306 |
| IPV4 Intolerant | IPV4 Tolerant | Adapt Outbound 306 |
| IPV4 Intolerant | IPV6 Tolerant | Adapt Outbound 306 |
| IPV4 Intolerant | IPV46 Intolerant | If Communication Endpoint 101N initiates in IPV6, Adapt Outbound 302/306. If Communication Endpoint 101A initiates in IPV4, no Adaptation. |
| IPV4 Intolerant | IPV46 Tolerant | Adapt Outbound 306 |
| IPV6 Intolerant | IPV6 Intolerant | No Adaptation |
| IPV6 Intolerant | IPV4 Tolerant | Adapt Outbound 306 |
| IPV6 Intolerant | IPV6 Tolerant | Adapt Outbound 306 |
| IPV6 Intolerant | IPV46 Intolerant | If Communication Endpoint 101N initiates in IPV4, Adapt Outbound 302/306. If Communication Endpoint 101A initiates in IPV6, no Adaptation. |
| IPV6 Intolerant | IPV46 Tolerant | Adapt Outbound 306 |
| IPV4 Tolerant | IPV4 Tolerant | No Adaptation |
| IPV4 Tolerant | IPV6 Tolerant | No Adaptation |
| IPV4 Tolerant | IPV46 Intolerant | Adapt Outbound 302 if addresses are the opposite address family from the connections address family. |
| IPV4 Tolerant | IPV46 Tolerant | No Adaptation |
| IPV6 Tolerant | IPV6 Tolerant | No Adaptation |
| IPV6 Tolerant | IPV46 Intolerant | Adapt Outbound 302 only if contains both IPV4 and IPV6 in same message |
| IPV6 Tolerant | IPV46 Tolerant | No Adaptation |
| IPV46 Intolerant | IPV46 Intolerant | Adaptation if the addresses are in a different family |
| IPV46 Intolerant | IPV46 Tolerant | Adapt Outbound 306 only if contains both IPV4 and IPV6 in same message |
| IPV46 Tolerant | IPV46 Tolerant | No Adaptation |

Based on Table 1, the communication system 120 (proxy server 121/IP version manager 126) changes the outbound messages 302/306 as necessary. In some embodiments, the adaptation may be to adapt only part of the IP addresses within the outbound message 302 and/or 306. In some cases, the inbound messages 300 and/or 304 may comprise both IPV4 and IPV6 addressing. For example, in a conference call with three or more parties, an IPV4 tolerant communication endpoint 101 may be conferenced with both an IPV6 intolerant communication endpoint 101 and an IPV4 intolerant communication endpoint 101. In this case, some or all of the inbound messages 300/304 that are directed to the IPV6 intolerant communication endpoint 101 and the IPV4 intolerant communication endpoint 101 may contain both IPV4 and IPV6 addresses. In these cases, the proxy server 121/IP version manager 126 can adapt the IP addresses as necessary to ensure IP version interoperability. Adaptation may include removing parts of headers, parameters, etc. in order to ensure interoperability.

For example, assume that the communication endpoint 101A is an IPV6 Intolerant communication entity and the communication endpoint 101N is an IPV4 Intolerant communication entity. In this example, the communication system 120 changes the IP version (IPV6) of the inbound message 300 to IPV4 in the outbound message 302. The communication system 120 changes the IP version by replacing/removing IP addresses at the application layer (e.g., the ISO 7 layer model). For example, by changing/removing IPV6 addresses in SIP messages. Likewise, the communication system 120 changes the IP version (IPV4) in the inbound message 304 to IPV6 in the outbound message 306. In the above example, there is only a single communication session (i.e., a dialog with a single session identifier) for the communication session between the communication endpoint 101A and 101N.

Alternatively, if the communication endpoint 101A is IPV6 Intolerant and the communication endpoint 101N is IPV6 intolerant, the communication system 120 does not need to change the IP addresses in either of the outbound messages 302/306 because both communication endpoints 101A and 101N are IPV6 intolerant. In this case it is assumed that the messages contain only IPV6 addresses because the communication endpoints 101A and 101N are both IPV6 intolerant.

Figure 4:
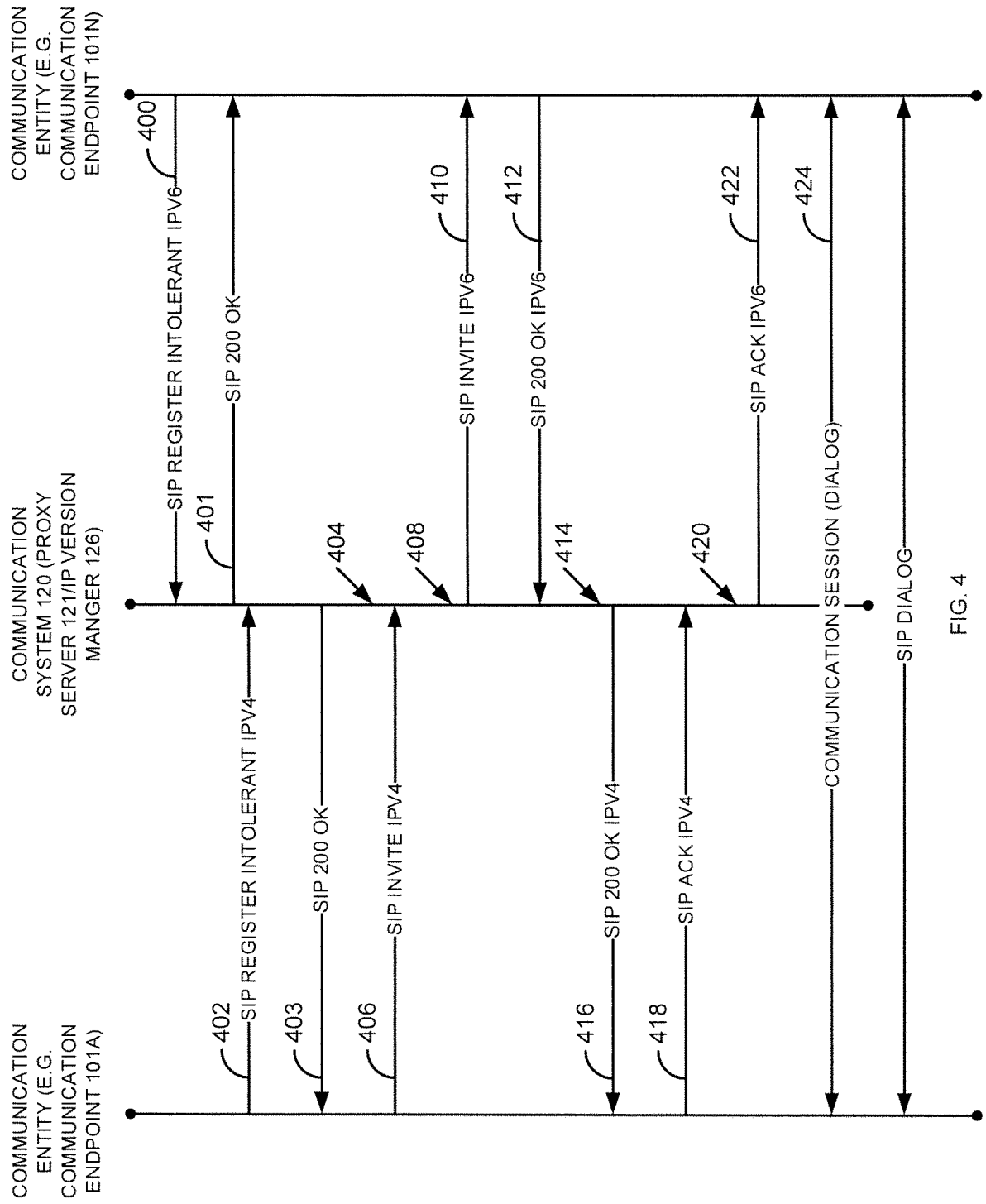
FIG. 4 is a flow diagram of a process for dealing with IP version tolerance/intolerance in a Session Initiation Protocol (SIP) communication session.

FIG. 4 is a flow diagram of a process for dealing with IP version intolerance in a Session Initiation Protocol (SIP) communication session. Illustratively, the communication endpoints 101A-101N, the IP protocol stacks 103/123, the network interfaces 104/124, the communication system 120A-120B, the proxy server 121, the B2BUAs 125, and the IP version manager 126 are stored-program-controlled entities, such as a computer or microprocessor, which performs the method of FIGS. 3-7 and the processes described herein by executing program instructions stored in a computer readable storage medium, such as a memory or disk. Although the methods described in FIGS. 3-7 are shown in a specific order, one of skill in the art would recognize that the steps in FIGS. 3-7 may be implemented in different orders and/or be implemented in a multi-threaded environment. Moreover, various steps may be omitted or added based on implementation.

The processes of FIGS. 4-7 are described using SIP messages. However, one of ordinary skill in the art would recognize that similar messages, such as those in H.323, WebRTC, H.624, G711, and the like may be adopted to the flow diagrams of FIGS. 4-7.

The process starts in step 400 when the communication endpoint 101N sends a SIP REGISTER message to the proxy server 121/IP version manager 126 indicating that the communication endpoint 101N is IPV6 Intolerant. The proxy server 121/IP version manager 126 sends, in step 401, a SIP 200 OK to the communication endpoint 101N. The communication endpoint 101A sends, in step 402, a SIP REGISTER message to the proxy server 121/IP version manager 126 that indicates that the communication endpoint 101A is IPV4 Intolerant. The proxy server 121/IP version manager 126 sends, in step 403, a SIP 200 OK to the communication endpoint 101A. The IP version manager 126 stores the IP tolerance types of the communication endpoints 101A and 101N in memory (e.g., in a database) in step 404.

In one embodiment, the communication endpoints 101A and 101N send the IP version intolerant information in the SIP REGISTER messages of steps 400 and 402 in a Contact header. Alternatively, the communication endpoints 101A and 101N may send the IP version intolerant information in other fields in the SIP REGISTER messages of steps 400 and 402. Alternatively, the registration process may use other messages, such as, SIP REFER message, a SIP OPTIONS message, a SIP INVITE message, a SIP SUBSCRIBE message, and/or the like.

In addition to registering using SIP REGISTER messages, communication endpoints 101 may be identified with a specific type of IP tolerance/intolerance in various other ways. For example, the IP version manager 126 may identify specific phone or device types and correlate the phone/device type to a specific type of IP version tolerance/intolerance type based on a list. Alternatively, for older devices that don't register, an administrator can administer the IP tolerance/intolerance type from an administration terminal (not shown).

The proxy server 121/IP version manager 126 receives, in step 406, a SIP INVITE message that uses IPV4 addresses. For example the SIP "To" and/or "From" headers in the SIP INVITE message may have IPV4 IP addresses. In one implementation, the SIP From: header may look as follows: From: "Joe@xyz.com" <sip:10000@10.172.0.2>. The proxy server 121/IP version manager 126, in step 408, adapts the 32 bit SIP address 10.172.0.2 to a 128 bit IPV6 address. For example, the adapted SIP From header may look like: From: "Joe@xyz.com" <sip:10000@FE80:0:0:0:202:B3FF:FE1E:8329>. The IPV6 address is the address of the communication system 120. This example uses local IPV6 addresses. However, in other embodiments, IPV6 global addresses may be used.

The proxy server 121/IP version manager 126 sends the adapted SIP INVITE message with the adapted IPV6 addresses, in step 410, to the communication endpoint 101N. The communication endpoint 101N sends a SIP 200 OK message in step 412. In the SIP 200 OK message of step 412, the communication endpoint 101N uses the IPV6 address of the communication system 120 (FE80:0:0:0:202:B3FF:FE1E:8329) in the SIP Contact header (e.g., To: "Joe@xyz.com" <sip:10000@FE80:0:0:0:202:B3FF:FE1E:8329). The proxy server 121/IP version manager 126 adapts, in step 414, the SIP 200 OK message of step 412 back to the IP address of 10.172.0.2. For example, the SIP From: field in the SIP 200 OK message of step 416 would look as follows: From: "Joe@xyz.com" <sip:10000@10.172.0.2. The proxy server 121/IP version manager 126 sends, in step 416, the adapted SIP 200 OK message to the communication endpoint 101A.

In response to the SIP 200 OK message of step 416, the communication endpoint 101A sends a SIP ACK message to the proxy server 121/IP version manager 126 in step 418. The proxy server 121/IP version manager 126 adapts (if necessary) the SIP ACK message in the same manner as described in step 408 in step 420 (replacing the SIP From header with an IPV6 address). The adapted SIP ACK message is sent, in step 422 to the communication endpoint 101N in step 422. A communication session is then established in step 424 (e.g., a voice call).

In this example, there is only a single SIP dialog that is between the communication endpoints 101A and 101N. The communication session between the communication endpoint 101A and 101N has a single session identifier (which is different from a telephone number).

The process of FIG. 4 is described using a SIP INVITE message, a SIP 200 OK message, and a SIP ACK message. However, in standard SIP, other types of messages may be involved in call setup, such as a SIP CANCEL, a SIP INFO, a SIP 180 RINGING, a SIP CANCEL, a SIP OPTIONS, a SIP PRAK, a SIP PUBLISH, a SIP TRYING, a SIP CALL IS BEING FORWARDED, a SIP QUEUED, a SIP SESSION IN PROGRESS, and/or the like. Similar adaptations can be used for these types of messages where necessary.

Figure 5:
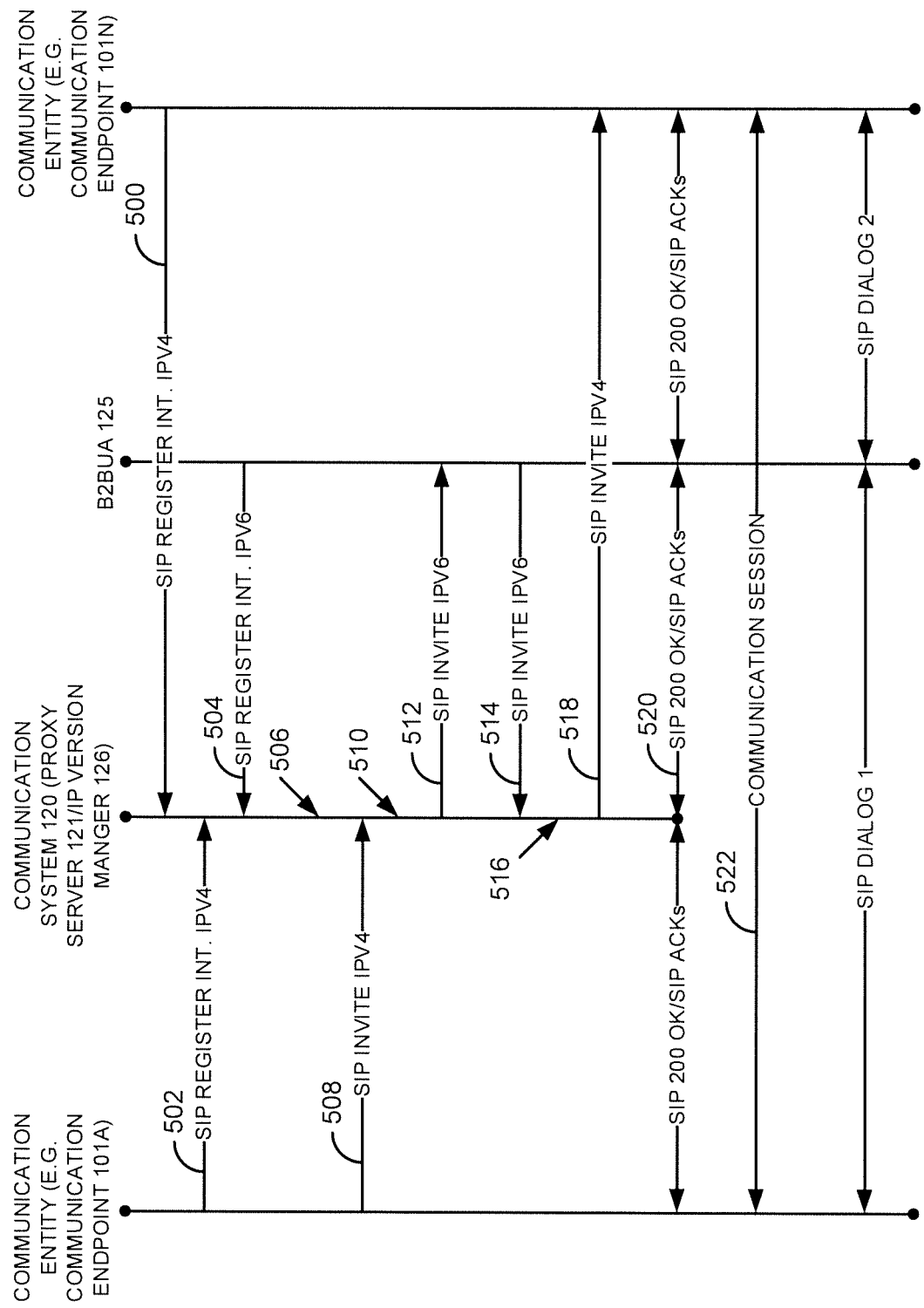
FIG. 5 is a flow diagram of a process for dealing with IP version tolerance/intolerance in a Session Initiation Protocol (SIP) communication session with a sequenced Back-to-Back User Agent.

FIG. 5 is a flow diagram of a process for dealing with IP version tolerance/intolerance in a Session Initiation Protocol (SIP) communication session with a sequenced Back-to-Back User Agent. The process of FIG. 5 is similar to the process of FIG. 4 with the addition of a SIP B2BUA 125 that has been added to the call flow. In FIG. 5, the B2BUA 125 is IP V6 intolerant for SIP messaging. In addition, the communication endpoints 101A and 101N are IPV4 intolerant.

In SIP, when a B2BUA 125 is added into the signaling message flow, typically all the SIP signaling messages flows through the B2BUA 125 as shown in FIG. 5. When the B2BUA 125 is added to the signaling call flow, the B2BUA 125 creates two separate dialogs: 1) SIP Dialog 1—from the communication endpoint 101A and the B2BUA 125, and 2) SIP Dialog 2—from the B2BUA 125 and the communication endpoint 101N. In this case, there are two separate communication sessions with separate session identifiers (i.e., as per standard SIP messaging as described in SIP RFC 3261 "SIP: Session Initiation Protocol June, 2002, which is incorporated herein by reference).

The process begins in step 500 when the communication endpoint 101N sends a SIP REGISTER message, to the IP version manager 126, indicating that the communication endpoint 101N is IPV4 intolerant. Likewise, the communication endpoint 101A sends a SIP REGISTER message, in step 502, to the IP version manager 126, indicating that the communication endpoint 101N is IPV4 intolerant. In this exemplary embodiment the B2BUA 125 also sends a SIP REGISTER message, in step 504, to the IP version manager 126, indicating that the B2BUA 125 is IPV6 intolerant. However, in another embodiment the B2BUA 125 may have its IP intolerance registered via an administrator. In response to the messages 500, 502, and 504, the IP version manager 126 stores, in step 506, the IP intolerance types of the communication endpoints 101A and 101N along with the IP intolerance type of the B2BUA 125 in memory (e.g., a database).

The communication endpoint 101A sends, in step 508, a SIP INVITE message using IPV4 addresses. The proxy server 121/IP version manager 126 adapts the SIP INVITE message in step 510 (e.g., as described in step 408 above). The proxy server 121/IP version manager 126 sends, in step 512, the adapted SIP INVITE message (adapted to IPV6) to the B2BUA 125. The B2BUA 125, sends, in step 514, the SIP INVITE message (adapted to IPV6 in step 510) to the proxy server 121/IP version manager 126. The proxy server 121/IP version manager 126 adapts the SIP INVITE message of step 514 back to IPV4 in step 516. The proxy server 121/IP version manager 126 sends, in step 518, the adapted SIP INVITE message (adapted back to IPV4) to the communication endpoint 101N. The process repeats the process of FIG. 4 with the additional step of sending the SIP 200 OK message though the B2BUA 125 (i.e., from 101N→120→125→120→101A) and the SIP ACK message (from 101A→120→125→120→101N) in step 520. The communication session is then established in step 522.

The process of FIG. 5 is discussed where there is a single B2BUA 125 involved in the communication session 522. In SIP, more than one B2BUA 125 may be sequenced into the communication session. In this case, after step 516, the proxy server 121/IP version manager 126 would send an adapted SIP INVITE message to the second B2BUA 125. The second B2BUA 125 then sends the SIP INVITE message back to the proxy server 121/IP version manager 126. This process would be repeated for each additional B2BUA 125.

The above descriptions describe specific SIP messages (e.g., SIP INVITE message, SIP 200 OK message, and SIP ACK message) and specific SIP headers that use IP addresses (e.g., SIP To and From headers). However, the process can convert IPV4 to IPV6 and IPV6 to IPV4 in any SIP messages where IP intolerance exists.

In one embodiment, with SIP third-party registration, wherein a registering SIP UA (e.g., a communication entity) is incompatible, a SIP ay.sig.iptolerance parameter that is passed in a SIP Contact header may have an IP address that is incompatible with another registering communication entity. In this case, IP adaption may be necessary if IP version incompatibility exists.

In one embodiment, if a third-party registering SIP UA (e.g., communication endpoint 101) is hosted on another server, which is not registered, the IP address of the registering SIP UA will be established based on the presence of a proprietary header that identifies the IP tolerance/intolerance type.

For SIP dialogs creating requests (e.g., a SIP INVITE message, a SIP SUBSCRIBE message, and a SIP REFER message) that are created by a first-party SIP UA, the registered SIP UA itself initiates a SIP dialog-creating request. The IP version manager 126 uses the IP version in the SIP Contact header.

In one embodiment, SIP Uniform Resource Identifiers (URI) that are in SIP headers are adapted as necessary to ensure IP version interoperability. For example, a SIP NOTIFY may comprise a SIP URI that uses IP addresses.

For a SIP INVITE message and a SIP SUBSCRIBE message any well know parameters may be used to communicate the IP version intolerance information. In addition, the communication system 120 may insert the IP version intolerance information as an escaped parameter before forwarding the message.

In SIP, escaped characters (new name percent encoding) is used to convert characters in the URI that are not allowed in the URI. For instance, white space is not allowed in the parameter of the URI; therefore, the white space is converted into percent encoding so that the string appears contiguous. The IP version manager 126 decodes the white space. For example, let's assume that the sending communication entity has a URI of "doug@example;param=Hello There". As there is a white space (between Hello and There) which will fail the URI parsing, before sending the sender will escape (or percent encode) "Hello There" to Hello %20There. The resulting URI will look like doug@example;param=Hello %20There. As you can see, after the encoding, there is no white space in the URI; instead, the white space character has been replaced with %20, which is the hex representation of the white space. Similar to this, there are other characters (called special characters) that must be percent encoded: e.g., ":"/"'"/"?"/ "#"/"["/"]"/"@". The Request -URI may contain av-nouri parameter because the adaptation uses av-nouri to store the original value of av-ouri parameter during adaptation. Since this can appear in a Contact header, and Contact header can be placed in Request-URI of a new request, the adaptation may need to convert the av-norui back to av-ouri. This may be an implementation specific adaptation. If the implementation stores the original parameter value (of a parameter that is to be adapted) in a differently named parameter, then it would have to undo that if it sees it in a Request-URI of an initial request.

For SIP INVITE messages where the outbound leg is IPV4 intolerant and the inbound leg is IPV4 tolerant or the outbound leg is IPV6 intolerant and the inbound leg IPV6 tolerant, the communication system 120 stores and strips the SIP Record-Route headers from the SIP INVITE message and inserts its own IP address that matches the IP address type of the next leg. For the corresponding response (e.g., a SIP 200 OK message), at the inbound leg, the communication system 120 inspects the contents of the SIP Record-Route header. If the communication system 120 modified the header during the request (in the SIP INVITE message), the communication system 120 restores the SIP Record-Route header. The above process is also used for mid-dialog messages. For example Record-Route headers may be adapted either by modifying the IP addresses or by stripping the headers altogether. Either way prevents sending Record-Route headers with the wrong IP address type to the communication endpoint 101.

If the outbound leg is IPV4 intolerant and the inbound leg is IPV4 tolerant or the outbound leg is IPV6 intolerant and the inbound leg is IPV6 tolerant, the communication system 120 strips SIP Via headers from the messages. The communication system 120 inserts its own IP address that matches the IP version of the next hop. During inbound processing, the communication system 120 inspects the contents of the SIP Via headers. If the SIP Via header has been modified the communication system 120 restores the SIP Via headers before processing the message.

The process of changing and restoring of the IP addresses in Record-Route headers that match the IP version on the next hop also applies to SIP Via headers for Record Route's. The communication system 120 can either strip the addresses and then add then back in the other direction, or adapt them by substitution of the IP addresses and then restoring original addresses back in the opposite direction.

The communication system 120 adapts SIP History-Info headers if the IP version of the Targeted-to-URI in the History-Info header is not supported by the communication entity. The communication system 120 inserts its own IP address as the Targeted-to-URI address and adds the original URI address (including the port number) as an escaped parameter ohiaddr' before forwarding the request.

For SIP REFER messages, if the IP version of the URI in the Refer-to header is not supported by the communication entity, before forwarding the request at the outbound leg, the communication system 120 inserts its own IP address as the URI address in the Refer-to header and adds the original URI address (including the port number) in specific parameters. The user-part and all parameters except for the transport parameter is maintained in the new Refer-To header. For an initial request (e.g., a SIP INVITE message), the proxy server 121/IP version manager 126 inserts own address as the URI address in the Request-URI and ads the original URI address as part of an escaped parameter before forwarding the request downstream. The user-part and parameters are maintained in the new Request-URI. For instance, if the Request-URI is sip:xyz@[2620::123]:old-port; paraml=xyz, the resulting REQUEST-URI will look like sip:xyz@192.168.1.1:new-port;paraml=xyz;av-oraddr=escaped ([2620::123]:old-port). Upon receiving an initial request with IP address of communication system 120 in the domain part and av-oraddr parameter in Request-URI, at the inbound leg. The IP version manager 126 restores the original domain and port of the Request-URI and removes the inserted parameter.

For a Mid-Dialog Request, if the inbound request contains the communication system's address in the Request-URI, the IP version manager 126 removes the communication manager's address and replaces it with the address in the parameter that IP version manager 126 inserted (i.e., av-ocaddr or av-oraddr) before forwarding the request. (Note: this reverse operation during mid-dialog request processing is resulting from the Contact header or REQUEST-URI adaptation done at the time of the initial request processing). For example, if the Request-URI of a mid-dialog request is xyz@192.168.1.1:new-port;paraml=xyz;av-oraddr=escaped ([2620::123]:old-port) where [192.168.1.1] is the communication system's address, the IP version manager 126 strips the communication manager's address and restores the original address and forward the request upstream with the Request-URI xyz@[2620::123]:old-port;paraml=xyz.

When multiple communication systems 120 are involved, the upstream communication system 120 adapts as necessary (e.g., as described in Table 1) to ensure interoperability between communications systems 120. For example, for a SIP INVITE message that is sent from an IPV6 tolerant communication system 120A to an IPV4 intolerant communication system 120B, the communication system 120A adapts the IPV6 addresses to IPV4 addresses for the SIP INVITE message. Likewise, for SIP 200 OK message that is sent from the communication system 120B, the communication system 120A adapts the SIP 200 OK message to IPV6 addresses.

Figure 6:
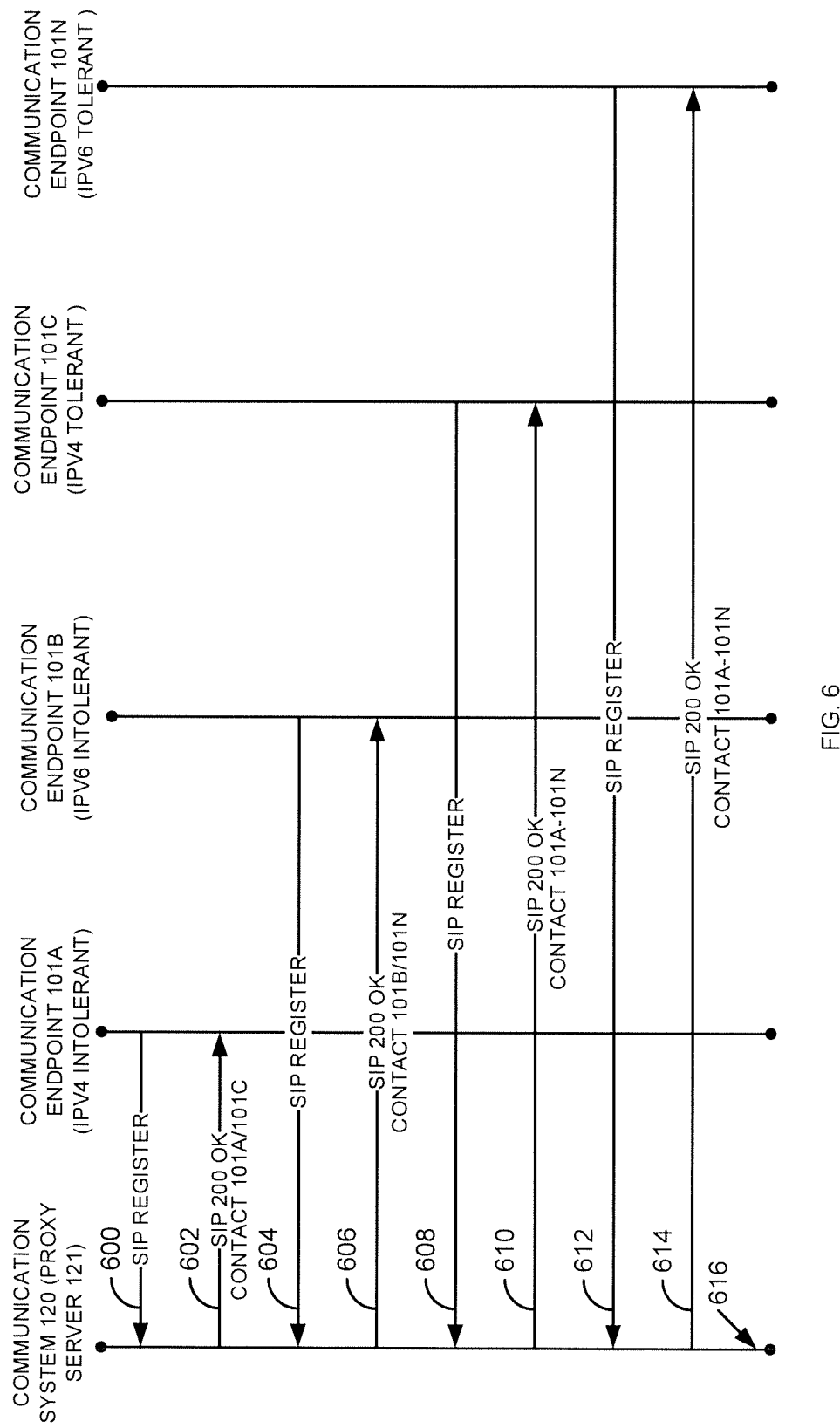
FIG. 6 is a flow diagram of a process for registering multiple communication endpoints of a user with a single address of record.

FIG. 6 is a flow diagram of a process for registering multiple communication endpoints 101 of a user with a single address of record. For example, a user may have an address of record of bob@companyxyz.com. In this example, the user (Bob) has four communication endpoints 101A-101N that are registered with the address of record bob@companyxyz.com.

The process begins, in step 600 when the communication endpoint 101A sends, in step 600, a SIP REGISTER message to the proxy server 121/IP version manager 126. In this example, the communication endpoint 101 registers that it is IPV4 intolerant. In response, the proxy server 121/IP version manager 126 sends, in step 602, a SIP 200 OK message. The SIP 200 OK message (of step 602) sent to the communication endpoint 101A contains the IP addresses of the communication endpoints 101A and 101C (no IPV6 addresses). The IP addresses of the communication endpoints 101B (IPV6 intolerant) and 101N (IPV6 tolerant) are stripped out of the SIP 200 OK message of step 602. Since communication endpoint 101A is IPV4 version intolerant, it cannot consume IPV6 contact addresses of communication endpoint 101B and 101N.

The communication endpoint 101B sends, in step 604, a SIP REGISTER message to the proxy server 121/IP version manager 126. The SIP REGISTER message of step 604 indicates that the communication endpoint 101B is IPV6 intolerant. In response, the proxy server 121/IP version manager 126 sends, in step 606, a SIP 200 OK message. The SIP 200 OK message (of step 606) sent to the communication endpoint 101B contains the IP addresses of communication endpoints 101B and 101N (no IPV4 addresses). The IP addresses of the communication endpoints 101A (IPV4 intolerant) and 101C (IPV4 tolerant) are stripped out of the SIP 200 OK message sent in step 606 because communication endpoint 101B cannot consume IPV4 addresses.

The communication endpoint 101C sends, in step 608, a SIP REGISTER message to the proxy server 121/IP version manager 126. The SIP REGISTER message of step 608 indicates that the communication endpoint 101C is IPV4 tolerant. In response, the proxy server 121/IP version manager 126 sends, in step 610, a SIP 200 OK message. The SIP 200 OK message (of step 610) sent to the communication endpoint 101C contains the IP addresses of communication endpoints 101A-101N because the communication endpoint 101C can handle both types of IP versions (IPV4 and IPV6).

The communication endpoint 101C sends, in step 612, a SIP REGISTER message to the proxy server 121/IP version manager 126. The SIP REGISTER message of step 612 indicates that the communication endpoint 101C is IPV6 tolerant. In response, the proxy server 121/IP version manager 126 sends, in step 614, a SIP 200 OK. The SIP 200 OK message (of step 614) sent to the communication endpoint 101N contains the IP addresses of communication endpoints 101A-101N because the communication endpoint 101N can handle both types of IP versions (IPV4 and IPV6).

FIG. 7 is a flow diagram of a process for call forking where multiple communication endpoints 101 of a user has been registered using a single address of record. The process of FIG. 7 is based on the registrations of FIG. 6. A SIP INVITE message is received, in step 700, at the proxy server 121/IP version manager 126 from communication endpoint 101X (another communication endpoint 101). The communication endpoint 101X is IPV4 intolerant. In this example, the SIP INVITE message of step 700 is forked, in steps 702 and 704 to communication endpoints 101A and 101C, which are the only communication endpoints 101 that support IPV4 associated with the address of record.

The call is answered at the communication endpoint 101C in step 705. This results in the SIP 200 OK message (with IPV4 addresses) being sent in step 706 from the communication endpoint 101C to the proxy server 121/IP version manager 126. In response to SIP 200 OK message, the proxy server 121/IP version manager 126 sends, in step 708, a SIP CANCEL message to the communication endpoint 101A to cancel that leg of the forked call. The proxy server 121/IP version manager 126 sends the SIP 200 OK message to the communication endpoint 101X (with IPV4 addresses) in step 710. The communication endpoint 101X sends, in step 712, a SIP ACK message to the proxy server 121/IP version manager 126. The SIP ACK message uses IPV4 addresses. The proxy server 121/IP version manager 126 sends, in step 714, the SIP ACK message (with IPV4 addresses) to the communication endpoint 101C. A communication session is then established in step 716.

In the above example, the SIP INVITE message is forked only to the communication endpoints 101A and 101C that support IPV4. However, in other embodiments, the SIP INVITE message may be forked to each of the communication endpoints 101A-101N. In this case, the forked SIP INVITE message sent to communication endpoint 101B (IPV6 intolerant) would have to be adapted per Table 1 to replace IPV4 addressing with IPV6 addressing. Likewise, a SIP 200 OK message (if answered) from the communication endpoint 101B would have to be adapted.

A similar process can be used for server clusters. For example where an incoming communication request may be directed to different servers based on loading. Instead of forking, the incoming request is directed by the communication system 120 to communicate with a particular server. Based on the IP tolerance type of the communication entity sending the request (e.g., a SIP INVITE message), different inbound and outbound messages can be adapted to provide IP version compatibility between the sender of the incoming request and the selected server.

IP version intolerance may also apply to serial forking. If the originally chosen server from the "cluster" cannot handle the request, the proxy server 121 may route the request (sequentially fork it) to an alternate server in the cluster. If each server supports a different address family connection, the request may have to be readapted when such alternate routing/forking occurs.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel®

Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network 110, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
   receiving, by a microprocessor, a first Session Initiation Protocol (SIP) REGISTER message for registering a first communication endpoint to be registered with one or more other communication endpoints using an address of record for a user;
   determining, by the microprocessor, that an Internet Protocol (IP) version of at least one of the one or more other communication endpoints does not match an IP version of the first communication endpoint;
   in response to determining that the IP version of the at least one of the one or more other communication endpoints does not match the first communication endpoint's IP version, removing, by the microprocessor, in a SIP 200 OK response message, an IP address for each of the at least one of the one or more other communication endpoints whose IP version does not match the first communication endpoint's IP version; and
   forking a SIP INVITE message into a plurality of SIP INVITE messages, wherein the forking is based on forking the plurality of SIP INVITE messages to only communication entities that use the same IP version as the address of record for the user.

2. The method of claim 1, further comprising:
   replacing each removed IP address with an IP address of a compatible IP version.

3. The method of claim 1, wherein at least one of the one or more other communication endpoints comprises a Back-to-Back User Agent (B2BUA).

4. The method of claim 3, wherein the B2BUA registers two separate SIP dialogs.

5. The method of claim 1, wherein determining, by the microprocessor, that the Internet Protocol (IP) version of the at least one of the one or more other communication endpoints does not match the first communication endpoint's IP version comprises processing a SIP intolerance parameter in a SIP contact header.

6. The method of claim 1, wherein the first communication endpoint is IPv4 intolerant and supports IPv6 only.

7. The method of claim 1, wherein the first communication endpoint is IPv6 intolerant and supports IPv4 only.

8. The method of claim 1, wherein removing, by the microprocessor, in the SIP 200 OK response message the IP address of each of the at least one of the one or more other communication endpoints whose IP version does not match the first communication endpoint's IP version comprising stripping SIP Record-Route headers including the IP address of each of the at least one of the one or more other communication endpoints whose IP version does not match the first communication endpoint's IP version with an IP address of a compatible IP version.

9. The method of claim 1, wherein removing, by the microprocessor, in the SIP 200 OK response message the IP address of each of the at least one of the one or more other communication endpoints whose IP version does not match the first communication endpoint's IP version comprising stripping SIP Via headers including the IP address of each of the at least one of the one or more other communication endpoints whose IP version does not match the first communication endpoint's IP version with an IP address of a compatible IP version.

10. A system comprising:
    a microprocessor; and
    a computer readable medium, coupled with the microprocessor and comprising microprocessor readable and executable instructions that cause the microprocessor to:
    receive, by athe microprocessor, a first Session Initiation Protocol (SIP) REGISTER message for registering a first communication endpoint to be registered with one or more other communication endpoints using an address of record for a user;
    determine, by the microprocessor, that an Internet Protocol (IP) version of at least one of the one or more other communication endpoints does not match an IP version of the first communication endpoint; and
    in response to determining that the IP version of the at least one of the one or more other communication endpoints does not match the first communication endpoint's IP version, remove, by the microprocessor, in a SIP 200 OK response message, an IP address of each of the at least one of the one or more other communication endpoints whose IP version does not match the first communication endpoint's IP version, and fork a SIP INVITE message into a plurality of SIP INVITE messages, wherein the forking is based on forking the plurality of SIP INVITE messages to only communication entities that use the same IP version as the address of record for the user.

11. The system of claim 10, wherein instructions further cause the microprocessor to:

replace the removed IP address of each of the at least one of the one or more other communication endpoints whose IP version does not match the first communication endpoint's IP version with an IP address of a compatible IP version.

12. The system of claim 10, wherein one of the one or more other communication endpoints comprises a Back-to-Back User Agent (B2BUA).

13. The system of claim 12, wherein the B2BUA registers two separate SIP dialogs.

14. The system of claim 10, wherein instructions further cause the microprocessor to:

process a SIP intolerance parameter in a SIP contact header to determine that the at least one of the one or more other communication endpoint's IP version does not match the first communication endpoint's IP version.

15. The system of claim 10, wherein the first communication endpoint is IPv4 intolerant and supports IPv6 only.

16. The system of claim 10, wherein the first communication endpoint is IPv6 intolerant and supports IPv4 only.

17. The method system of claim 10, wherein instructions further cause the microprocessor to:

strip SIP Record-Route headers including the IP address of each of the at least one of the one or more other communication endpoints whose IP version does not match the first communication endpoint's IP version with an IP address of a compatible IP version.

18. The system of claim 10, wherein instructions further cause the microprocessor to:

strip SIP Via headers including the IP address of each of the at least one of the one or more other communication endpoints whose IP version does not match the first communication endpoint's IP version with an IP address of a compatible IP version.

* * * * *

UNITED STATES PATENT AND TRADEMARK OFFICE
CERTIFICATE OF CORRECTION

| | | |
|---|---|---|
| PATENT NO. | : 11,677,792 B2 | Page 1 of 1 |
| APPLICATION NO. | : 17/161142 | |
| DATED | : June 13, 2023 | |
| INVENTOR(S) | : Tibor Lukac and Harsh V. Mendiratta | |

It is certified that error appears in the above-identified patent and that said Letters Patent is hereby corrected as shown below:

In the Claims

At Column 18, Line 46, in Claim 10, please delete "athe" and insert --the-- therein.

Signed and Sealed this
Twelfth Day of September, 2023

Katherine Kelly Vidal
*Director of the United States Patent and Trademark Office*